United States Patent

[11] 3,622,521

| [72] | Inventors | John P. Hogan;<br>Donald R. Witt, both of Bartlesville, Okla. |
|---|---|---|
| [21] | Appl. No. | 661,846 |
| [22] | Filed | Aug. 21, 1967 |
| [45] | Patented | Nov. 23, 1971 |
| [73] | Assignee | Phillips Petroleum Company |

[54] OLEFIN POLYMERIZATION WITH CHROMIUM AND TITANIUM-CONTAINING COMPOUNDS
9 Claims, No Drawings

[52] U.S. Cl. ..................................................... 252/430, 252/441, 252/458, 260/93.7, 260/94.9
[51] Int. Cl. .......................................................... C08f 1/66, C08f 3/06
[50] Field of Search .............................................. 260/94.9 D; 252/430, 431, 458, 455, 458, 441

[56] References Cited
UNITED STATES PATENTS

| 3,349,067 | 10/1967 | Hill.............................. | 260/88.2 |
| 2,825,721 | 3/1958 | Hogan et al................... | 260/94.9 |

*Primary Examiner*—Joseph L. Schofer
*Assistant Examiner*—Edward J. Smith
*Attorney*—Young and Quigg

ABSTRACT: Catalyst formed by first adding to a support a chromium-containing compound using an aqueous medium and then adding a titanium-containing compound using a nonaqueous medium.

OLEFIN POLYMERIZATION WITH CHROMIUM AND TITANIUM-CONTAINING COMPOUNDS

This invention relates to a new and improved catalyst and the method for making same. This invention also relates to a polymerization process employing the catalyst of this invention.

It was recently discovered that polymers of 1-olefins of increased melt index can be obtained by using a catalyst which comprises a combination of a support, at least one chromium-containing compound, and at least one titanium-containing compound wherein the titanium-containing compound was added to the support using a nonaqueous medium and then the chromium-containing compound was added to the titanium-containing support also using a nonaqueous medium.

By this invention it has been found that a catalyst which also gives substantially improved melt index polymer and which can be used in both a solution process (U.S. Pat. No. 2,825,721, the disclosure of which is hereby incorporated herein by reference) and a particle-form process (U.S. Pat. No. 3,087,917 and British Pat. No. 853,414, the disclosures of both of which are hereby incorporated herein by reference) can be formed using an aqueous medium for the chromium-containing compound if the chromium-containing compound is dispersed with the support before the titanium-containing compound, the mixture is dried, and thereafter the titanium-containing compound is dispersed with the chromium-containing support using a nonaqueous medium.

Thus, the discovery of this invention gives the significant advantage that substantial increases in the melt index of the polymer formed can be obtained when using either a solution or a particle-form process when compared to more conventional catalyst and, in addition, the catalyst is easier to make since the chromium-containing compound can be added to the support by use of an aqueous medium. In other words, the requirement of a nonaqueous medium has been alleviated for the chromium-containing compound thereby simplifying the procedure by which the catalyst can be formed.

The relatively high melt index of the 1-olefin polymers obtained by use of the catalyst of this invention allows such polymers to be used in paper coating applications and as substitutes for microcrystalline waxes. These applications generally were not heretofore possible for particle-form process polymers because of the low melt index of such polymers when made with other catalysts. By the use of the catalyst of this invention polymers having the full desired melt index range including the very high melt index range portion, can be produced in the particle-form process, and a manufacturer will therefore not have to build a separate solution process plant to make higher melt index polymers.

The catalyst of this invention employs a combination of a support material to which has first been added a chromium-containing material in an aqueous medium wherein at least part of the chromium is in the hexavalent state or is convertible at least in part to the hexavalent state by heating in the presence of molecular oxygen, followed by drying of the chromium-containing support, and then followed by the addition to the chromium-containing support of at least one titanium-containing compound in a substantially nonaqueous medium.

The polymerization process of this invention comprises polymerizing 1-olefins in a conventional manner except that the catalyst employed for the polymerization process is the catalyst of this invention. It has also been found that one class of nonaqueous solvents or dispersants gives higher melt index polymers than other solvents. This class of solvents or dispersants is the nitrogen-containing, nonaqueous solvents such as pyridine. It has been found that the improved melt index polymers are obtained if a solvent or dispersant or mixture of solvents or dispersants from this preferred class are used in depositing the titanium-containing compound onto the chromium-containing support or if the chromium-containing support is treated (contacted) with one or more members of the preferred class of solvents or dispersants prior to the deposition thereon of the titanium-containing compound, the titanium-containing compound in the latter case, if deposited by way of a solvent or dispersant, being deposited by way of a nonaqueous solvent or dispersant that is different from the preferred class of solvents or dispersants used to pretreat the chromium-containing support.

The polymers produced using the catalyst of this invention are useful for making plastic articles such as bottles, e.g. baby bottles, bottle carriers, and the like.

Accordingly, it is an object of this invention to provide a new and improved polymerization catalyst.

It is another object to provide a new and improved polymerization process.

It is another object to provide a new and improved process for making a catalyst.

It is yet another object to provide a new and improved catalyst, a process for making same, and a polymerization process, all of which contribute to producing 1-olefin polymers having high melt indexes, particularly when the polymerization process employed is a particle-form process.

Other aspects, objects, and the several advantages of this invention will be apparent to one skilled in the art from the description and appended claims.

By this invention conventional catalyst supports or bases, e.g. silica, alumina, zirconia, thoria, and mixtures of two or more of these materials, are first combined with a chromium-containing compound or compounds without regard to the water content of the support, the chromium-containing compound or compounds or the medium employed in depositing the chromium-containing compound or compounds on the support. In other words, this combining step is carried out in the presence of water, i.e. at least 2 weight percent water based on the weight of the chromium compound(s) being added to the support. The chromium-containing compound can be combined with the support in any conventional manner such as by mechanical mixing in water and the like. The support can be impregnated or refluxed with an aqueous solution or dispersion of any chromium compound which is at least in part hexavalent chromium oxide or can be converted at least in part to hexavalent chromium oxide by heating in the presence of molecular oxygen. Suitable compounds include chromium trioxide, chromic nitrate, chromic acetate, chromic chloride, chromic sulfate, ammonium chromate, ammonium dichromate, or other soluble salts of chromium.

In making the catalyst of this invention, sufficient amounts of chromium-containing compound or compounds should be employed so that the final catalyst contains from about 0.1 to about 50, preferably from about 0.1 to about 10, weight percent, based on the weight of the final catalyst, chromium oxide calculated as chromium trioxide.

Following the application of the chromium-containing compound or compounds to the support, the chromium-containing support is separated from any excess chromium compound or solution of chromium compound, and dried, preferably by heating at a temperature range of from about 75° to about 500° F. for a period of from about 1 minute to about 5 hours in an ambient or nonaqueous atmosphere.

Thereafter the titanium-containing compound or compounds is added to the chromium-containing support. Titanium-containing compounds can be selected from those represented by the formulas (I) $(R')_n Ti(OR')_m$, (II) $(RO)_m Ti(OR')_n$; where $m$ is 1, 2, 3, or 4; $n$ is 0, 1, 2, or 3; $m+n=4$; and (III) $TiX_4$; where R is selected from a group consisting of alkyl, aryl, and cycloalkyl groups and combinations thereof such as aralkyl, alkaryl, and the like, each group having one to 12 carbon atoms, inclusive; R' is selected from a group consisting of R, cyclopentadienyl, and alkenyl groups formulae two to 12 carbons atoms, inclusive, e.g. ethenyl, propenyl, isopropenyl, butenyl, and the like; and X is one of chlorine, bromine, iodine, and fluorine. Preferred are formulae I and II because of their oxygen to carbon bonding.

If the titanium-containing compound used is liquid, it can be combined with the support as such or dissolved or dispersed in a nonaqueous solvent or dispersant. If the titanium-containing compound used is a solid, it can be dissolved or dispersed in a nonaqueous solvent or dispersant for combination with the support. Combination of the titanium-containing compounds with the support can be effected in any conventional manner such as by impregnation, spraying, refluxing, and the like. The chromium-containing support, titanium-containing compound, and any medium used to combine the titanium-containing compound with the support should, when considered cumulatively, be substantially nonaqueous, i.e. contain a total of less than 5 weight percent water based on the combination of materials being considered. Individually, a substantially nonaqueous medium would also be that which contains less than 5 weight percent water based on the total weight of the medium being employed. Similarly, a substantially nonaqueous chromium-containing support will contain less than chromium-containing weight percent water based on the total weight of the chromium-containing support.

Examples of titanium-containing compounds that can be used are titanium methoxide, titanium isopropoxide, titanium n-butoxide, titanium isononoxide, titanium dodecoxide, titanium cyclopentoxide, titanium cyclooctoxide, titanium cyclododecoxide, titanium phenoxide, titanium toloxide, tributyltitanium isobutoxide, tridodecyltitanium propoxide, triethyltitanium phenoxide, tricyclobutyltitanium benzyloxide, triscyclopentadienyltitanium benzyloxide, biscyclopentadienyltitanium diisopropoxide, triethenyltitanium cyclohexoxide, dodecenyltitanium ditriphenoxide, bispropenyltitanium diethoxide, titanium 2,4-cyclopentadienyloxide, diisopropoxytitanium-di-3-butenyloxide, triethoxytitanium-6-dodecenyloxide and the like.

In making the catalyst of this invention, a sufficient amount of titanium-containing compound or compounds should be employed so that the final catalyst contains from about 1 to about 10 weight percent titanium based on the total weight of the final catalyst.

Following the application of the titanium-containing compound or compounds, the titanium- and chromium-containing support is separated from any excess titanium compound or solution of titanium compound, dried in the same manner set forth hereinabove for the chromium-containing support in the presence of a substantially nonaqueous atmosphere.

Thereafter, the titanium- and chromium-containing support is activated in the same manner as described in U.S. Pat. No. 2,825,721. Generally, activation is carried out in dry (substantially nonaqueous) air for from about 1 to about 50 hours using a temperature in the range of from about 350° to about 2000° F. The results of such activation is such that at least part of the chromium is in or is converted to the hexavalent state. Optionally, a 1 to 10 hour reduction step, using carbon monoxide for example, at a temperature in the range of 400° to 1600° F. can also be used.

The chromium- and/or titanium-containing materials can be applied to a support under any operable conditions of temperature, pressure, and the like including room temperature and atmospheric pressure as well as elevated temperatures and pressures. The concentrations of the chromium- and/or titanium-containing compounds in any given solution or dispersion is that which is sufficient to give the desired amount of chromium and titanium in the final catalyst as set forth hereinabove.

Generally, any nondeleterious, substantially nonaqueous solvent or dispersant can be used for applying the titanium-containing compound or compounds to the chromium-containing support. Such solvents or dispersants include saturated aliphatic, saturated cycloaliphatic, and aromatic hydrocarbons and mixtures thereof, said hydrocarbons having four to twelve carbon atoms per molecule, inclusive. Examples of such hydrocarbons include n-heptane, toluene, cyclohexane, benzene, and the like. Other solvents and dispersants include alcohols having from one to ten carbon atoms per molecule, inclusive, such as propyl alcohol, isobutyl alcohol, sec-butyl alcohol, tert-butyl alcohol, amyl alcohol, cyclohexanol, cresols, phenol, and the like. Other solvents and dispersants that can be used and which are a preferred class of solvents or dispersants for this invention are nitrogen-containing compounds such as pyridine, N-methylpyrrolidone, N,N-dimethylformamide, acetonitrile, N,N-diethylacetamide, N,N-dimethylacetamide, triethylamine, methyl-substituted pyridines, formamide, n-butylamine, dipropylamine, aniline, methylaniline, toluidine, phenylenediamine, diphenylamine, triphenylamine, benzidine, and the like.

The catalyst of this invention can be employed in any conventional solution or particle-form process for homopolymerizing or copolymerizing 1-olefins such as those having two to eight carbon atoms per molecule, inclusive. Examples of suitable 1-olefins include ethylene, propylene, 4-methylpentene-1, hexene-1, octene-1, and the like.

Polymerization processes using the catalyst of this invention can employ broad ranges of operating conditions. Generally, the polymerization temperature will range from about 100° to about 500° F. using pressures ranging from about 100 to about 700 p.s.i.a. or higher, and catalyst concentrations of from about 0.001 to about 10 weight percent based upon the weight of the reactor contents. Reaction can be carried out gas phase, liquid phase, or in the presence of a diluent or solvent. The diluents or solvents used can vary widely but will generally be paraffins and/or cycloparaffins having from three to twelve carbon atoms per molecule, inclusive. Examples of such diluents and solvents include propane, isobutane, n-butane, isopentane, isooctane, cyclohexane, methylcyclohexane, diisopropyl, n-nonane, methylcyclopentane, dimethylcyclopentane, and the like. The polymerization can also be carried out in the presence of hydrogen. A full and complete disclosure of such polymerization processes can be found in U.S. Pat. Nos. 2,825,721 and 3,087,917 as well as British Pat. No. 853,414.

EXAMPLE I

Several different catalysts were prepared, some in accordance with this invention and others not so in accordance in order to demonstrate the differences obtained by the instant invention when compared to the control runs. In all of the catalysts tested, the chromium trioxide content was 1.9 weight percent and the titanium content was about 5 weight percent, both weight percents based upon total weight of catalyst. Each catalyst was prepared as follows:

Catalyst A (support plus aqueourus $CrO_3$)

A commercial chromium oxide-silica catalyst produced and identified as Davison 969–MS prepared by impregnation of porous microspheriodal silica containing about 0.1 weight percent alumina with an aqueous chromium trioxide solution and dried at 200° to 400° F. for several minutes in air.

Catalyst B: (Invention)

A 12.4-gram portion of Catalyst A was impregnated by contact with a 11.35 weight percent solution of titanium isopropoxide in cyclohexane. The excess cyclohexane was removed by heating in an evaporating dish at about 300° F. in air.

Catalyst C (Support plus nonaqueous titanium compound plus aqueous $CrO_3$)

Porous microspheroidal silica in the amount of 4.59 grams containing about 0.1 weight percent alumina was dried at 500° F. for 1 hour in air and then impregnated with a 2.6 weight percent toluene solution of titanium isopropoxide. The excess titanium isopropoxide solution was removed by filtration and washing with toluene. The titanium-containing support was dried in an evaporating dish in air at about 300° F., impregnated by contact with an aqueous chromium trioxide solution containing 0.5 weight per cent chromium trioxide, and then dried in an evaporating dish at about 300° F. in air.

Catalyst D: (Invention)

A 7.13-gram portion of Catalyst A was dried at 300° F. for 1 hour in air, impregnated by contact with a cyclohexane solution containing 8.15 weight percent titanium tetrachloride. The excess cyclohexane was removed by heating in an evaporating dish at about 300° F. in air.

Catalyst E: (Invention)

An 8.7-gram portion of Catalyst A was dried at 300° F. for 1 hour in air, impregnated by contact with an ethanol solution of titanium isopropoxide containing 11.8 weight percent titanium isopropoxide. The excess ethanol was removed by heating in an evaporating dish at about 300° F.

Catalyst F: (Invention)

A 5.26-gram portion of microspherioidal silica was dried at 500° F. for 1 hour in air, contacted with sufficient cyclohexane to make a past consistency and then contacted with 0.166 gram of ammonium chromate. The resulting mixture was ground 15 minutes at room temperature, the cyclohexane being added as needed to maintain a paste consistency. The mixture was dried at 200° F. for 20 minutes in a vacuum. The catalyst was then activated by heating at 1300° F. for 5 hours in air. Two grams of the activated catalyst was sprayed with 1.05 grams of liquid titanium isopropoxide, and mixed, to give a free-flowing material.

Catalyst G: (Support plus aqueous $CrO_3$)

A commercial nonporous silica marketed by Cabot Corporation and identified as Cabosil M-5, was densified by the addition of water thereto, dried at 1000° F. for 1 hour in air, screened through a 100-mesh sieve (U.S. Sieve Series), impregnated by contact with an aqueous chromium trioxide solution containing 0.54 weight percent chromium trioxide, and dried in an evaporating dish at about 300° F. and rescreened.

Catalyst H: (Invention)

A 7.31-gram portion of catalyst G was impregnated by contact with a cyclohexane solution of titanium isopropoxide containing 9.2 weight percent titanium isopropoxide, and dried in an evaporating dish at about 300° F.

Catalyst I: (Support plus nonaqueous titanium compound plus aqueous $CrO_3$)

A 10.88-gram portion of nonporous silica identified as Cabosil M-5 was densified by the addition of water thereto, dried at 1000° F. for 1 hour in air, screened through a 100-mesh sieve, impregnated with a cyclohexane solution of titanium isopropoxide containing 9.75 weight percent titanium isopropoxide, heated at 1000° F. for 1 hour in air. A 9.5-gram portion of this material was impregnated by contact with an aqueous solution of chromium trioxide containing 0.45 weight percent chromium trioxide, and dried in air in an evaporating dish at about 300° F. and rescreened.

All of Catalysts A through I, after the preparation procedure set forth hereinabove, were activated at 1300° F. for 5 hours in dry air, i.e. air containing less than 0.5 p.p.m. water.

The activated Catalysts A through I were then tested in a particle-form ethylene polymerization process using a conventional 2-liter reactor which was first warmed to 220° F., flushed with nitrogen, cooled to 150° F., and then flushed with isobutane. Thereafter, in the following order, there was added the catalyst, 567 grams of isobutane. The temperature was then raised to within the range of 225° to 235° F., and ethylene added in amounts sufficient to raise and maintain a pressure of about 500 p.s.i.g. The results of the runs are given in the following table.

It can be seen that for runs B, D, E, and F (invention runs) a considerably greater value for melt index was obtained over Catalysts A and C which were not prepared according to the invention. Similarly, Catalyst H (invention) also obtained a polymer of greatly increased melt index over Catalysts G and I. The data for Catalyst C with the porous support and for Catalyst I with the nonporous support indicate that the addition of the titanium-containing compound first from a nonaqueous medium followed by the addition of the chromium-containing compound from an aqueous medium does not give the melt index improvement obtained by adding the chromium-containing compound first from an aqueous medium and then the titanium-containing compound second from a nonaqueous medium.

EXAMPLE II

The following catalysts, all containing 1.0 weight percent $CrO_3$, were used to demonstrate this invention:

Catalyst J:

A commercial chromium oxide-silica catalyst made by Davison Chemical Company and identified as low-chromium Davison 969–MS, prepared by impregnation of porous microspheroidal silica containing about 0.1 weight percent alumina with an aqueous $CrO_3$ solution, and dried at 250° to 400° F. for several minutes in air.

Catalyst K: (Invention)

A 5.21-gram portion of Catalyst J was dried 1 hour at 500° F. in air, impregnated by contact for several minutes at 75° F. with a solution of 0.64 grams of titanium isopropoxide and 0.49 grams of pyridine in 28 milliliters of cyclohexane, and dried to about 250° F. for several minutes at 75° F. for several minutes in the absence of moisture.

Catalyst L:

A 5.05-gram portion of Catalyst J was dried 1 hour at 500° F. in air, impregnated by contact for several minutes at 75° F. with a solution of 0.62 gram of titanium isopropoxide in 27 milliliters of cyclohexane, and dried at about 250° F. for several minutes in the absence of moisture.

Catalyst M (Invention)

A 4.62-gram Catalyst J was dried 1 hour at 500° F. in air, impregnated by contact for several minutes at 75° F. with a solution of 0.49 grams of pyridine in 20 milliliters of cyclohexane, dried at about 300° F. for several minutes in the absence of moisture, impregnated by contact for several minutes at 75° F. with a solution of 1.04 grams of titanium isopropoxide in 23 milliliters of cyclohexane, and dried at about 250° F. for 5.29-gram minutes in the absence of moisture.

Catalyst N:

A 5.29-gram portion of Catalyst J was dried 1 hour at 500° F. in air, impregnated by contact for several minutes at 75° F. with a solution of 1.17 grams of titanium isopropoxide in 30 milliliters of cyclohexane, and dried at about 250° F. for several minutes in the absence of moisture.

All catalysts were activated in dry air, i.e. less than 0.5 p.p.m. water, for 5 hours at 1300° F. before use.

The above catalysts were tested in a particle-form ethylene polymerization run in the following manner: A conventional 2-liter reactor was warmed to 220° F., flushed with nitrogen, then cooled to 150° F., and flushed with isobutane. The catalyst was added, then cooled to 150° F., and flushed with

TABLE 1

| Catalyst | Catalyst, grams | Polymerization period, min. | Titanium compound used | Solvent for the titanium compound | Melt index [1] | Support |
|---|---|---|---|---|---|---|
| A [2] | 0.115 | 60 | None | | 0.43 | Porous. |
| B (inv.) | 0.081 | 100 | Titanium isopropoxide | Cyclohexane | 3.5 | Do. |
| C [3] | 0.111 | 90 | ----do---- | Toluene | 0.34 | Do. |
| D (inv.) | 0.077 | 80 | Titanium tetrachloride | Cyclohexane | 1.03 | Do. |
| E (inv.) | 0.071 | 70 | Titanium isopropoxide | Ethanol | 1.41 | Do. |
| F (inv.) | 0.078 | 130 | ----do---- | None | 1.15 | Do. |
| G [2] | 0.063 | 90 | None | | 0.03 | Non-porous. |
| H (inv.) | 0.095 | 90 | Titanium isopropoxide | Cyclohexane | 0.46 | Do. |
| I [3] | 0.082 | 130 | ----do---- | ----do---- | 0.02 | Do. |

[1] As determined by ASTM D 1238–62T, condition E.
[2] Support plus aqueous chromium oxide.
[3] Support plus nonaqueous titanium compound plus aqueous chromium oxide.

isobutane. The catalyst was added, then isobutane (567 grams). The temperature was adjusted to 225° to 230° F., and ethylene was added on demand to raise and maintain a pressure of about 500 p.s.i.g. Results are given in the following table:

TABLE II

| Catalyst | Ti, wt. percent | Catalyst, grams | Polymerization period, hours | Melt index [1] |
|---|---|---|---|---|
| J [2] | 0.0 | 0.068 | 70 | 0.35 |
| K(inv.) [3] | 2.0 | 0.071 | 80 | 0.98 |
| L [3] | 2.0 | 0.082 | 85 | 0.51 |
| M(inv.) [3] | 3.5 | 0.080 | 90 | 3.1 |
| N [3] | 3.5 | 0.079 | 100 | 2.4 |

[1] ASTM D 1238-62T, condition E.
[2] Support plus aqueous $CrO_3$.
[3] Support plus aqueous $CrO_3$ plus titanium isopropoxide.

It is apparent from a comparison of the data for Catalysts K and L that a considerable increase in polymer melt index is obtained by having pyridine present during the titanium impregnation step (Catalyst K). It is also apparent from a comparison of the data for Catalysts M and N that a similar increase in polymer melt index is obtained when the pyridine is applied to the titanium impregnation step (Catalyst M).

Reasonable variation and modification are possible within the scope of this disclosure without departing from the spirit and scope thereof.

That which is claimed is:

1. A method for producing a catalyst comprising forming a first combination by combining with a support selected from the group consisting of silica, alumina, zirconia and thoria, a water-soluble chromium-containing compound having at least a portion of said chromium convertible to the hexavalent state, said chromium-containing compound being combined from an aqueous solution with said support in an amount such that the catalyst produced is made to contain from about 0.1 to about 50 weight percent chromium oxide substantially drying said first combination, forming a second combination by combining with said substantially dried first combination in the substantial absence of water at least one titanium-containing compound having one of the formulas $TiX_4$, $(R')_nTi(OR')_m$, and $(RO)_mTi(OR')_n$ where X is one of chlorine, bromine, iodine and fluorine, $m$ is 1,2,3 or 4, $n$ is 0,1,2 or 3, $m+n=4$ and R is $m$ cycloalkyl, aryl, and combinations thereof, each having 1 and 12 carbon atoms, inclusive, and R' is R, cyclopentadienyl and alkenyl groups having two to 12 carbon atoms, inclusive, said titanium-containing compound being combined with said first combination such that the catalyst produced is made to contain from about 1 to about 10 weight percent titanium, drying said second combination and activating the dried second combination by converting at least a portion of said chromium to the hexavalent state.

2. The method according to claim 1 wherein said second combination is formed in the presence of less than 5 weight percent water based upon the total weight of materials present in said second combination.

3. The method according to claim 1 in which said support is contacted with an aqueous solution of said chromium-containing compound to form said first combination and said first combination is contacted with a substantially nonaqueous solution of said titanium-containing compound in one of cyclohexane, toluene, pyridine and ethanol.

4. The method according to claim 3 in which said support is a mixture of silica and alumina, said water-soluble chromium-containing compound is chromium trioxide, said titanium-containing compound is one of titanium isopropoxide and titanium tetrachloride, said support being impregnated with an aqueous solution of said chromium trioxide to form said first combination, said second combination being formed by impregnating said first combination with a substantially nonaqueous solution of said titanium-containing compound in one of cyclohexane, toluene and ethanol.

5. The method according to claim 4 in which said substantially nonaqueous solution comprises less than 5 weight percent water based on the total weight of the chromium containing support.

6. The method according to claim 1 wherein said substantially dried first combination is contacted with at least one of pyridine, N-methylpyrrolidine, N,N-dimethylformamide, acetonitrile, N,N-diethylacetamide, N,N-dimethylacetamide, triethylamine, methyl-substituted pyridine, formamide, n-butylamine, dipropylamine, triphenylamine, and benzidine.

7. The method of claim 1 in which said first combination is formed by impregnating silica-containing alumina with an aqueous chromium trioxide solution and said substantially dried first combination is contacted with a solution comprising about 11 weight percent titanium isopropoxide in cyclohexane to form said second combination.

8. The method of claim 1 in which said first combination is formed by impregnating silica-containing alumina with an aqueous chromium trioxide solution, and said substantially dried first combination is contacted with a solution comprising about 12 weight percent titanium isopropoxide in ethanol to form said second combination.

9. The method of claim 1 in which said first combination is formed by impregnating silica-containing alumina with an aqueous chromium trioxide solution and said substantially dried first combination is contacted with a solution comprising cyclohexane and pyridine prior to impregnation with a solution comprising titanium isopropoxide in cyclohexane.

* * * * *

UNITED STATES PATENT OFFICE
CERTIFICATE OF CORRECTION

Patent No. 3,622,521      Dated November 23, 1971

Inventor(s) John P. Hogan et al.

It is certified that error appears in the above-identified patent and that said Letters Patent are hereby corrected as shown below:

Claim 1, column 7, line 45, "m" should read -- alkyl, --; line 46, "and", first occurrence, should read -- to --.

Signed and sealed this 23rd day of May 1972.

(SEAL)
Attest:

EDWARD M. FLETCHER, JR.　　　　　　　ROBERT GOTTSCHALK
Attesting Officer　　　　　　　　　　Commissioner of Patents